US011687728B2

(12) United States Patent
Huang et al.

(10) Patent No.: US 11,687,728 B2
(45) Date of Patent: Jun. 27, 2023

(54) TEXT SENTIMENT ANALYSIS METHOD BASED ON MULTI-LEVEL GRAPH POOLING

(71) Applicant: Jinan University, Guangzhou (CN)

(72) Inventors: Feiran Huang, Guangzhou (CN); Guan Liu, Guangzhou (CN); Yuanchen Bei, Guangzhou (CN)

(73) Assignee: JINAN UNIVERSITY, Guangzhou (CN)

(*) Notice: Subject to any disclaimer, the term of this patent is extended or adjusted under 35 U.S.C. 154(b) by 0 days.

(21) Appl. No.: 17/845,284

(22) Filed: Jun. 21, 2022

(65) Prior Publication Data

US 2022/0405480 A1  Dec. 22, 2022

(30) Foreign Application Priority Data

Jun. 22, 2021  (CN) .......................... 202110689751.9

(51) Int. Cl.
*G06F 40/30* (2020.01)
*G06F 40/166* (2020.01)
*G06N 3/04* (2023.01)

(52) U.S. Cl.
CPC ............ *G06F 40/30* (2020.01); *G06F 40/166* (2020.01); *G06N 3/04* (2013.01)

(58) Field of Classification Search
CPC ............................... G06F 40/30; G06F 40/166
See application file for complete search history.

(56) References Cited

U.S. PATENT DOCUMENTS

| | | | | |
|---|---|---|---|---|
| 11,521,639 B1* | 12/2022 | Shon | ...................... | G10L 25/63 |
| 2021/0097368 A1* | 4/2021 | Lin | ......................... | G06N 3/04 |
| 2021/0150685 A1* | 5/2021 | Chen | ........................ | G06T 1/20 |
| 2021/0166065 A1* | 6/2021 | Chang | ................... | G06T 7/0002 |
| 2021/0342684 A1* | 11/2021 | Shraga | ................. | G06F 16/243 |
| 2021/0350587 A1* | 11/2021 | Pan | ....................... | G06F 3/0482 |
| 2022/0121949 A1* | 4/2022 | Chang | ..................... | G06F 18/29 |
| 2022/0175287 A1* | 6/2022 | Li | ............................ | A61B 5/18 |
| 2022/0188641 A1* | 6/2022 | Hicks | .................. | G06F 11/3688 |
| 2022/0245802 A1* | 8/2022 | Wang | ..................... | G16H 30/20 |
| 2022/0405480 A1* | 12/2022 | Huang | ..................... | G06N 3/04 |
| 2022/0414792 A1* | 12/2022 | Huang | ................... | G06N 3/063 |
| 2023/0026252 A1* | 1/2023 | Muhammedali | ....... | G06Q 10/10 |

* cited by examiner

*Primary Examiner* — Kevin Ky
(74) *Attorney, Agent, or Firm* — WPAT, P.C

(57) ABSTRACT

A text sentiment analysis method based on multi-level graph pooling includes steps of: preprocessing a target text; taking collocate point mutual information between word nodes as an edge weight between the word nodes, and building a graph for each text independently; constructing a multi-level graph pooling model, of which a gated graph neural network layer transfers low-level information, a first graph self-attention pooling layer performs an initial graph pooling operation and uses a Readout function to extract low-level features, a second graph self-attention pooling layer performs a graph pooling operation again, performs a pruning update on the graph structure by calculating attention scores of nodes in the graph and uses a Readout function to extract high-level features; obtaining a multi-level final vector representation through a feature fusion function; and selecting a sentiment category corresponding to a maximum probability value as a final sentiment category output of the text.

8 Claims, 5 Drawing Sheets

TEXT SENTIMENT ANALYSIS METHOD BASED ON MULTI-LEVEL GRAPH POOLING

TECHNICAL FIELD

The invention relates to the field of text sentiment analysis technology, in particularly to a text sentiment analysis method based on multi-level graph pooling.

BACKGROUND

In recent years, with the rapid development of the Internet and its affiliated industries, the amount of information on the Internet is growing rapidly, and massive text-based data with big data characteristics are generated on the Internet every day, how to quickly classify and analyze these massive text-based data is an urgent problem to be solved. A sentiment expression of text reflects people's understanding and sentiment tendency of text, and is a high-level abstraction of information of the text. Text sentiment analysis is an important task for text classification and analysis. For example, sentiment mining on the content of microblog and blog in social networking websites is beneficial to public opinion analysis, and sentiment analysis on user product comments of e-commerce platforms is helpful to precise marketing recommendation of platforms and better understanding of products by consumers. Therefore, it is of great value to use effective sentiment analysis techniques to extract effective sentiment information from a large number of text data, and then mine and analyze real sentiments and expressed content features of users, which makes the text sentiment analysis become a hot research direction in the field of computer natural language processing.

Most of existing text sentiment analysis techniques based on machine learning are sequence models using recurrent neural networks and their variants or one-dimensional convolutional neural networks as base modules, these sequence models can better capture semantic information in local continuous word sequences, but may ignore global word collocate with non-continuity and long-distance semantics, and thus the mining of text features is not sufficient, structural features of a text are not mined and key sentiment information in the text is not paid attention to, which has certain limitations. Moreover, the sentiment information in the text is relatively high-level abstract information, if the mining of feature information is not sufficient, it would affect a final effect of sentiment analysis.

SUMMARY

To solve the deficiencies and shortcomings of the related art, a first purpose of the invention is to provide a text sentiment analysis method based on multi-level graph pooling, which from a perspective of building a graph from a text, mines text feature information from multiple aspects and multiple levels simultaneously, thereby obtains a more accurate sentiment analysis effect.

A second purpose of the invention is to provide a text sentiment analysis system based on multi-level graph pooling.

A third purpose of the invention is to provide a storage medium.

A fourth purpose of the invention is to provide a computing device.

In order to achieve the above purposes, the invention proposes technical solutions as follows.

A text sentiment analysis method based on multi-level graph pooling according to an embodiment of the invention includes steps of:

preprocessing a target text, wherein the preprocessing includes: removing noisy information, performing word segmentation, removing stop words, and training text representation of numerical vectorization;

building a graph from preprocessed text, including: setting a sliding window with a fixed length to slide on text word sequences, calculating collocate point mutual information between word nodes, taking the collocate point mutual information between the word nodes as an edge weight between the word nodes, and performing edge connection between words, to thereby build a text graph for each text individually;

constructing a multi-level graph pooling model, wherein the multi-level graph pooling model includes: a gated graph neural network layer, a first graph self-attention pooling layer, a graph convolutional layer, and a second graph self-attention pooling layer;

wherein the gated graph neural network layer is connected to the first graph self-attention pooling layer, the first graph self-attention pooling layer is connected to the graph convolutional layer, and the graph convolutional layer is connected to the second graph self-attention pooling layer;

wherein the gated graph neural network layer is configured to transfer low-level node information, the first graph self-attention pooling layer is configured to perform an initial graph pooling operation and use a Readout function to extract low-level features for obtaining a low-level text graph vector representation; the graph convolution layer is configured to simultaneously employ a node feature vector matrix of the text graph and a normalized Laplacian matrix of the text graph to participate in calculation; and the second graph self-attention pooling layer is configured to perform a graph pooling operation again, perform a pruning update on a structure of the text graph through calculating attention scores of nodes in the text graph, and use a Readout function to extract high-level features for obtaining a high-level text graph vector representation;

feature fusion, including: using a feature fusion function to fuse obtained text graph vector representations of different levels to thereby obtain a multi-level resultant vector representation; and sentiment category output, including: taking the multi-level resultant vector representation as input, obtaining a sentiment category probability distribution through a linear fully concatenated layer and a SoftMax classification layer, and selecting a sentiment category corresponding to a maximum probability value as a resultant sentiment category output of text.

As a preferred technical solution, the removing noisy information includes: using a regular expression to filter the noisy information;

the performing word segmentation includes: using a word segmentation tool to perform the word segmentation on text data that has been removed the noisy information to convert a text sequence into a corresponding word list after word segmentation;

the removing stop words includes: performing stop word processing through a stop word list on the corresponding word list after word segmentation to obtain a word list that has been removed the stop words; and the training text representation of numerical vectorization includes: employing a word2vec word feature embedding training to obtain initial word embedding vectors of the word list corresponding to the text data, and adding a vector representing a word position to each of the initial word embedding vectors to thereby obtain word embedding vectors fused with word position information.

As a preferred technical solution, calculation formulas for the calculating collocate point mutual information between word nodes are as follows:

$$PMI(i, j) = \log \frac{p(i, j)}{p(i) \times p(j)}$$

$$p(i, j) = \frac{N(i, j)}{N}$$

$$p(i) = \frac{N(i)}{N}$$

$$p(j) = \frac{N(j)}{N}$$

where, PMI(i, j) represents the collocate point mutual information between word nodes, N(i, j) represents a quantity of collocate sliding windows each containing both a word node i and a word node j, N(i) represents a quantity of sliding windows each containing the node i, N(j) represents a quantity of sliding windows each containing the node j, and N represents a total quantity of sliding windows used for sliding the whole text.

As a preferred technical solution, the gated graph neural network layer transfers low-level node information specifically includes:

the gated graph neural network layer is set with a rest gate and an update gate, calculation formulas for the reset gate in one time of information transfer are as follows:

$$r_v = \sigma(W^{(r)} \cdot x_v + U^{(r)} h)$$

$$h = \frac{1}{K} \sum_{i}^{K} h_i$$

$$h' = \tanh(W \cdot x_v + r_v \odot Uh)$$

where, $x_v$ represents a feature vector of current central node, $h_i$ represents a feature vector of any one neighboring node of the current central node, h' represents feature information after passing through the reset gate, K represents a total number of neighboring nodes of the current central node, $W^{(r)}$, $U^{(r)}$, W and U represent trainable weight matrices, σ represent a sigmoid activation function, and ⊙ represents a Hadamard product operation;

calculation formulas for the update gate in one time of information transfer are as follows:

$$z_v = \sigma(W^{(z)} \cdot x_v + U^{(z)} h)$$

$$h = \frac{1}{K} \sum_{i}^{K} h_i$$

$$x'_v = z_v \odot h + (1 - z_v) \odot h'$$

where, $x_v'$ represent a feature vector obtained after the current central node passing through node information transfer and aggregation of the reset gate and the update gate, and $W^{(z)}$ and $U^{(z)}$ represent trainable weight matrices; and during each time of parameter update, each node receiving information of its neighboring nodes and sending information to its the neighboring nodes, realizing transfer of information in the text graph based on information transfer of gated recurrent unit (GRU) in text sequences, and outputting updated text graph vector representation.

As a preferred technical solution, the performing a pruning update on a structure of the text graph through calculating attention scores of nodes in the text graph includes:

calculating the attention scores based on graph convolution through calculation formulas as follows:

$$\text{score} = \sigma(\tilde{A} X \theta)$$

$$\tilde{A} = D^{-1/2} A' ^{-1/2}$$

where, θ represents a trainable weight matrix, Ã represents a regularized adjacency matrix, D represents a degree matrix, A' represents an adjacency matrix with self-loops, X represents a text graph feature vector, and σ represents an activation function; and selecting top-k nodes to be retained according to calculated attention scores of nodes and updating a topology of the text graph.

As a preferred technical solution, a calculation formula for the graph convolutional layer is as follows:

$$X' = \sigma(\tilde{L}_{sym} \cdot X \cdot W)$$

where, $\tilde{L}_{sym}$ represents the normalized Laplacian matrix with self-loops, X and X' respectively represent node feature vector matrices of the text graph before and after the information transfer, W represents a trainable weight matrix, and σ represents an activation function As a preferred technical solution, a calculation formula for each the Readout function is as follows:

$$G = \text{Concat}\left(\max(X_1, \ldots, X_n), \frac{\sum_{i=1}^{n} X_i}{N}\right)$$

where, G represents a vector representation of the whole text graph, $X_i$ represents a vector representation of a node i, Concat represents a vector concatenate function, max represents a maximum function, and N represents a total number of nodes in the text graph.

In order to achieve the above second purpose, the invention proposes a technical solution as follows:

a text sentiment analysis system based on multi-level graph pooling, includes: a text preprocessing module, a text graph building module, a multi-level graph pooling model constructing model, a feature fusing module, and a sentiment category outputting module;

the text preprocessing module is configured to preprocess a target text, wherein the preprocess includes: removing noisy information, performing word segmentation, removing stop words, and training text representation of numerical vectorization;

the text graph building module is configured to build a text graph from preprocessed text for each text individually, specifically comprising to: set a sliding window with a fixed length to slide on text word sequences, calculate collocate point mutual information between word nodes, take the collocate point mutual information between the word nodes as an edge weight between the word nodes, and perform edge connection between words;

the multi-level graph pooling model constructing model is configured to construct a multi-level graph pooling model, the multi-level graph pooling model includes: a gated graph neural network layer, a first graph self-attention pooling layer, a graph convolutional layer, and a second graph self-attention pooling layer;

the gated graph neural network layer is connected to the first graph self-attention pooling layer, the first graph self-attention pooling layer is connected to the graph convolutional layer, and the graph convolutional layer is connected to the second graph self-attention pooling layer;

the gated graph neural network layer is configured to transfer low-level node information, the first graph self-attention pooling layer is configured to perform an initial graph pooling operation and use a Readout function to extract low-level features for obtaining a low-level text graph vector representation; the graph convolution layer is configured to simultaneously employ a node feature vector matrix of the text graph and a normalized Laplacian matrix of the text graph to participate in calculation; and the second graph self-attention pooling layer is configured to perform a graph pooling operation again, perform a pruning update on a structure of the text graph through calculating attention scores of nodes in the text graph, and use a Readout function to extract high-level features for obtaining a high-level text graph vector representation;

the feature fusing module is configured to perform feature fusion, comprising to: use a feature fusion function to fuse obtained text graph vector representations of different levels to thereby obtain a multi-level resultant vector representation; and the sentiment category outputting module is configured to perform sentiment category output, including to: take the multi-level resultant vector representation as input, obtain a sentiment category probability distribution through a linear fully concatenated layer and a SoftMax classification layer, and select a sentiment category corresponding to a maximum probability value as a resultant sentiment category output of text.

In order to achieve the above third purpose, the invention proposes a technical solution as follows:

a computer readable storage medium stored with a program, the program is configured to, when executed by a processor, implement the above text sentiment analysis method based on multi-level graph pooling.

In order to achieve the above fourth purpose, the invention proposes a technical solution as follows:

a computing device, includes: a processor and a memory stored with a program executable by the processor; the processor is configured to, when executing the program stored in the memory, implement the above text sentiment analysis method based on multi-level graph pooling.

Compared with the related art, the invention may achieve beneficial effects as follows.

(1) the invention models the text from the perspective of the graph model, compared with a modeling mode based on a sequence, global word collocate information with non-continuity and long-distance semantics is more fully considered; and moreover, the graph structure itself contains richer text structure information, so that more effective sentiment information can be mined.

(2) the invention fuses multiple levels of feature vectors, low-level specific features and high-level abstract features can be simultaneously mined through multiple levels of graph pooling operations, key information in the text graph can be constantly noticed by combining a graph attention mechanism, and meanwhile, less important nodes are pruned, which can well prevent next deeper level feature extraction from overfitting, and improve the accuracy and robustness of sentiment analysis of the model.

DETAILED DESCRIPTION OF EMBODIMENTS

In order to make purposes, technical solutions and advantages of the invention clearer, the invention will be further described in detail below in combination with the accompanying drawings and embodiments. It should be understood that specific embodiments described herein are merely illustrative of the invention and are not intended to limit the invention.

Embodiment 1

Figure 1:
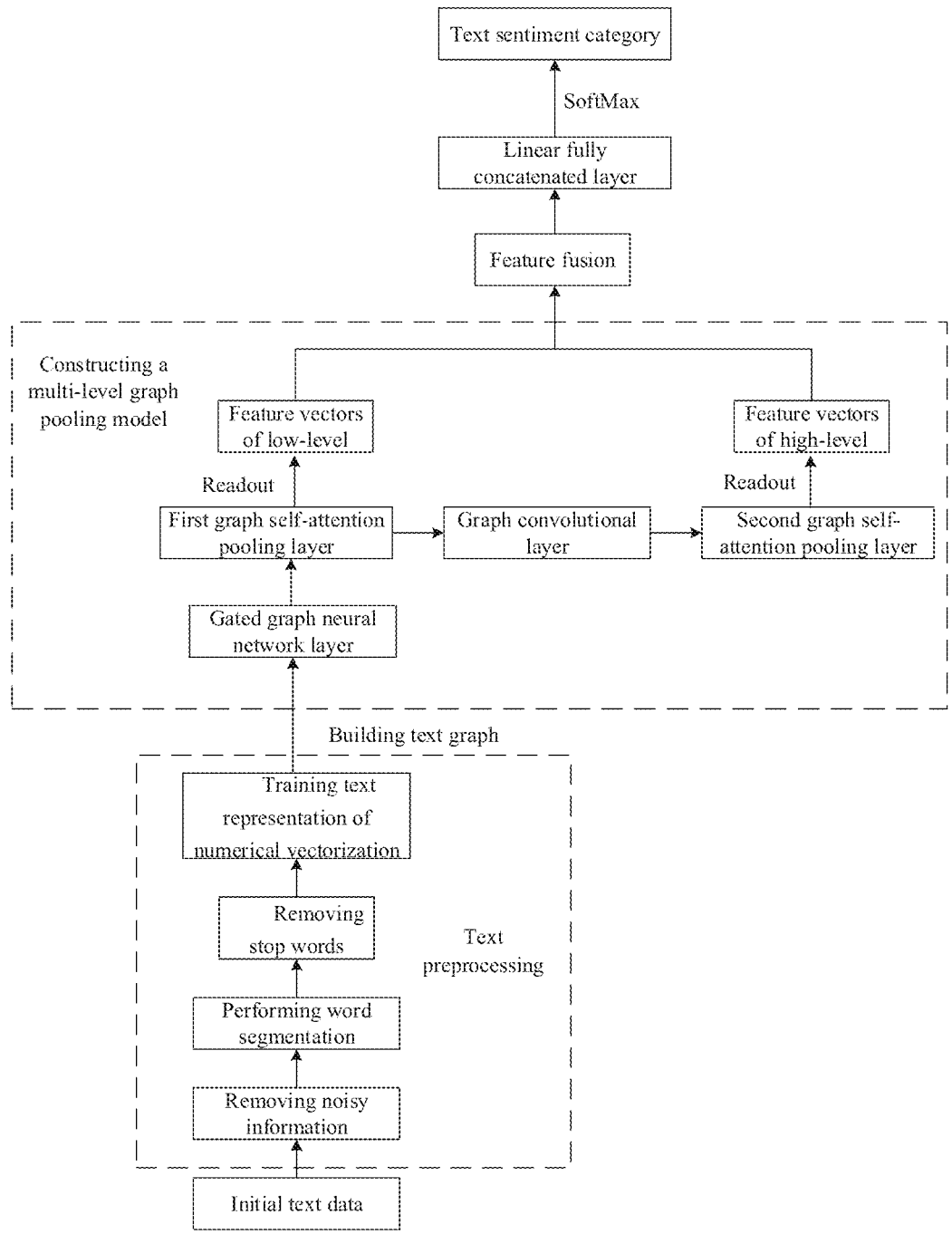
FIG. 1 illustrates a flowchart of a text sentiment analysis method based on multi-level graph pooling according to the invention.

As illustrated in FIG. 1, a text sentiment analysis method based on multi-level graph pooling according to an embodiment of the invention may steps S1~S5 as follows.

S1, Text Preprocessing

Preprocessing a target text may specifically include: removing noisy information irrelevant to a sentiment analysis task, performing word segmentation, removing stop words in the text, and training text representation of numerical vectorization.

In the step S1, preprocessing text data may specifically include sub-steps S11~S14 as follows.

S11, Removing Noisy Information

The text data is preprocessed by a regular expression to filter the noisy information irrelevant to the sentiment analysis task, such as URL (abbreviation for uniform resource locator) and garbled characters, to thereby obtain text data that has been removed the noisy information.

S12, Performing Word Segmentation

For the text data that has been removed the noisy information, a word segmentation tool is employed to perform word segmentation thereon to convert a text sequence into a corresponding word list after word segmentation.

S13, Removing Stop Words

For the corresponding word list after word segmentation, a stop word processing is performed thereon through a stop word list to obtain a word list that has been removed the stop words.

S14, Training Text Representation of Numerical Vectorization

A word2vec word feature embedding training is employed to obtain initial word embedding vectors of the word list corresponding to the text data, and then each of the initial word embedding vectors is added with a vector representing a word position to obtain word embedding vectors fused with word position information.

S2, Text Graph Building

When a multi-level graph pooling model is used to perform text sentiment analysis, it is required to firstly build a graph from a text (also referred to as build a text graph), and a specific building method may be that: for a given text D, sliding a sliding window with a set length of L on text word sequences backwards from the beginning until the whole text is scanned, and calculating collocate point mutual information (PMI) between word nodes during the whole sliding process as an edge weight between the word nodes.

Specifically, the calculation process of the collocate point mutual information between the word nodes may be that: in the whole sliding process of the sliding window, N (i, j) is set as the quantity of collocate sliding windows each containing a word node i and a word node j at the same time, N (i) is set as the quantity of sliding windows each containing the word node i, and N (j) is set as the quantity of sliding windows each containing the word node j, and N is set as the quantity of sliding windows used for sliding the whole text; and the collocate point mutual information (PMI) of the word node i and the word node j is calculated as follows:

$$PMI(i, j) = \log \frac{p(i, j)}{p(i) \times p(j)}$$

$$p(i, j) = \frac{N(i, j)}{N}$$

$$p(i) = \frac{N(i)}{N}$$

$$p(j) = \frac{N(j)}{N}.$$

The graph is individually built for each text D, and for various words in the text D, if two words do not collocate with each other, edges are not connected, whereas if words are collocated with each other, edges are connected between the two words by taking the above calculation value (PMI value) of collocate point mutual information as the edge weight between the two words, thereby completing the graph built from the text.

S3, Constructing a Multi-Level Graph Pooling Model

Figure 2:
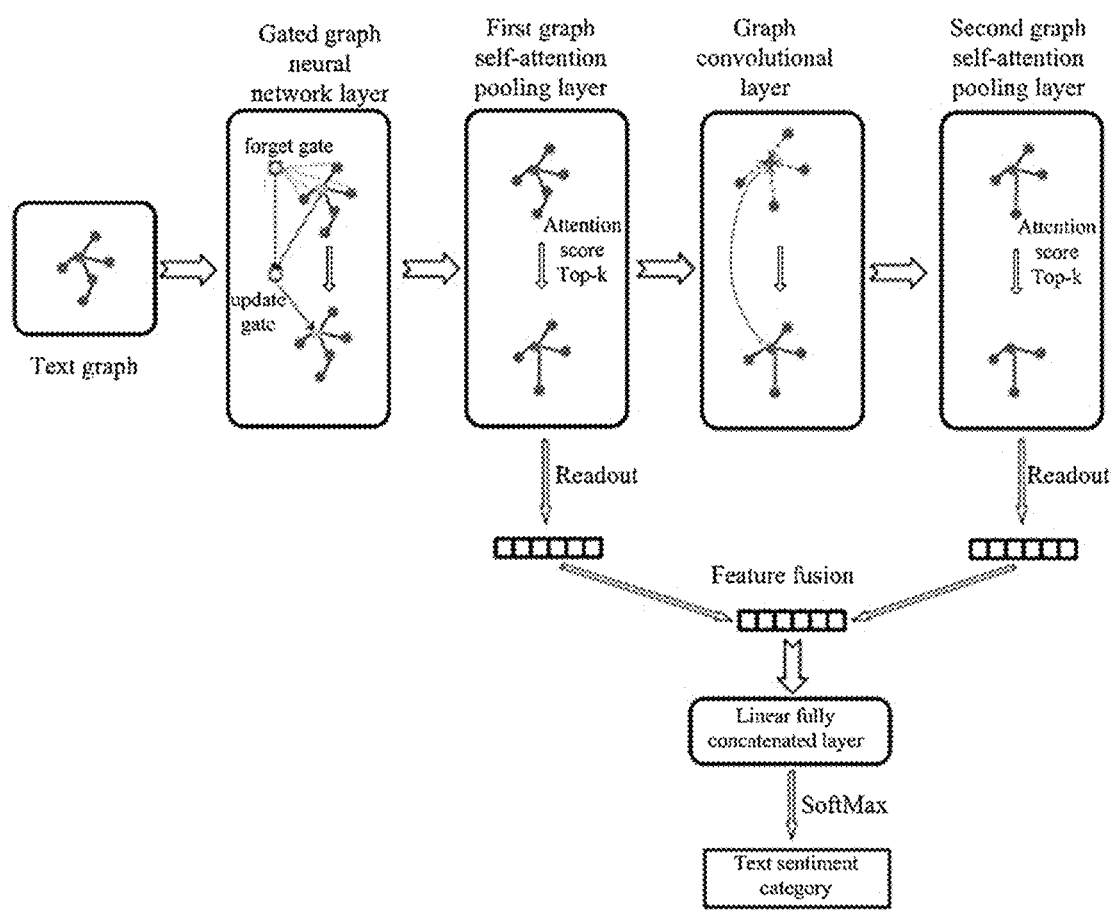
FIG. 2 illustrates a schematic view of an overall structure of a multi-level graph pooling model according to the invention.

As illustrated in FIG. 2, vectors of the built text graph are input to the multi-level graph pooling model and may sequentially pass through: a gated graph neural network (GGNN) layer, a first graph self-attention pooling layer, a graph conventional layer, and a second graph self-attention pooling layer.

The multi-level graph pooling method used in this embodiment is to introduce graph pooling operations into the field of text sentiment analysis, compared with existing major language sequence based models, considers more abundant text semantics and structural information from the perspective of graph model, and gradually extracts features from low-level to high-level through multi-level graph pooling and Readout operations and then fuses the extracted features of low-level and high-level, thereby improving the accuracy of sentiment analysis of the model.

After low-level node information is transferred through the gated graph neural network layer, the first graph self-attention pooling layer is used to perform an initial graph pooling operation on the graph, so that important nodes in the graph are retained and the structure of the graph is updated, and at this time, low-level features are extracted through a set Readout function. Subsequently, the graph convolutional layer is used to perform further deeper level of node information transfer and aggregation to obtain higher level of abstract semantic features, and afterwards the second graph self-attention pooling layer is used to perform a graph pooling operation again to further retain nodes with higher attention scores and more importance to the sentiment analysis objective and perform a pruning update on the structure of the graph, and then high-level features of the text graph are read out through a Readout function; and finally the readout low-level features and high-level features of the graph will be fused through a feature fusion algorithm in the step S4.

In the step S3, the constructing a multi-level graph pooling model may include S31~S34 as follows.

S31, Gated Graph Neural Network Layer

Figure 3:
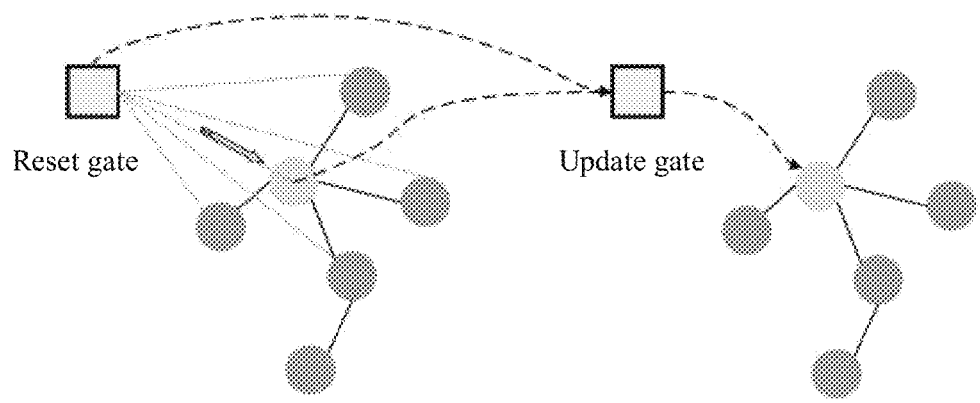
FIG. 3 illustrates a schematic operation diagram of a gated graph neural network layer according to the invention.

As illustrated in FIG. 3, an action process of the gated graph neural network layer may be that: taking vectors of the text graph as input, employing the principle of gated recurrent unit (GRU) of recurrent neural network variant for information propagation among nodes of the whole graph, and setting a reset gate (also referred to as forget gate) and an update gate. The reset gate is configured (i.e., structured and arranged) to mainly determine how much information in neighboring nodes is to be forgotten, and the update gate is configured to help the model to decide information of how many neighboring nodes should be passed to current node and aggregated with the current node.

Specifically, calculation formulas for the reset gate in one time of information transfer may be that:

$$r_v = \sigma(W^{(r)} \cdot x_v + U^{(r)} h)$$

$$h = \frac{1}{K} \sum_i^K h_i$$

$$h' = \tanh(W \cdot x_v + r_v \odot Uh)$$

where, $x_v$ represents a feature vector of current central node, $h_i$ represents a feature vector of any one neighboring node of the current central node, h' represents feature information after passing through the reset gate, K represents a total number of neighboring nodes of the current central node, $W^{(r)}$, $U^{(r)}$, W and U represent trainable weight matrices, σ represent the sigmoid activation function, and ⊙ represents a Hadamard product operation.

On the basis of the operation of the reset gate, calculation formulas for the update gate in one time of information transfer may be that:

$$z_v = \sigma(W^{(z)} \cdot x_v + U^{(z)} h)$$

$$h = \frac{1}{K} \sum_i^K h_i$$

$$x'_v = z_v \odot h + (1 - z_v) \odot h'$$

where, $x_v'$ represent a feature vector obtained after the current central node passes through the node information transfer and aggregation of the reset gate and the update gate, $h_i$ represents a feature vector of any one neighboring node of the current central node, h' represents the feature information after passing through the reset gate, K represents the total number of neighboring nodes of the current central node, $W^{(z)}$ and $U^{(z)}$ represent trainable weight matrices, σ represent the sigmoid activation function, and ⊙ represents the Hadamard product operation.

During realizing each time of parameter update, each node not only receives information of its neighboring nodes, but also sends information to its the neighboring nodes, and the transfer of information in the text graph is realized based on information transfer principle of GRU in text sequences, and an updated text graph vector representation is output consequently.

S32, Graph Self-Attention Pooling Layer

Figure 4:
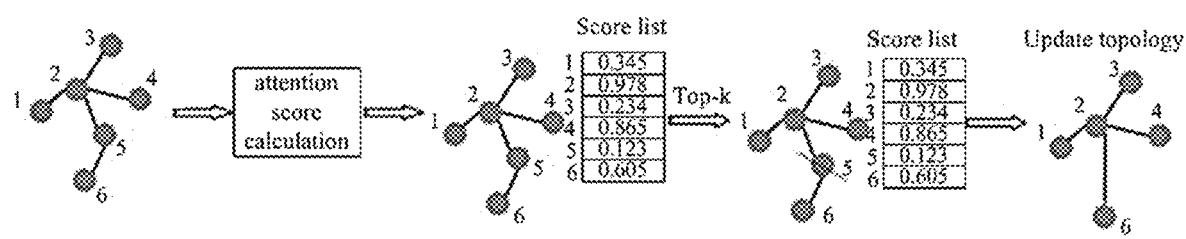
FIG. 4 illustrates a schematic operation diagram of a graph self-attention pooling layer according to the invention.

As illustrated in FIG. 4, an action process of the graph self-attention pooling layer may be that: the graph self-attention pooling layer takes output vectors of the preceding model operation directly/immediately connected thereto as input, an objective of this layer is to screen out nodes that bring key sentiment features by calculating attention scores of respective nodes in the graph, delete a less relevant node with a lower attention score and update the topology of the graph, while avoiding possible overfitting in the next deeper level layer. In this layer, the self-attention mechanism is used to distinguish the node to be deleted from the node to be retained, and the self-attention mechanism calculates the attention score based on graph convolution. Because an operator based on graph convolution uses both a node feature vector matrix of graph and a regularized adjacency matrix for operation, this method considers both node features and topological structure information of the text graph. Specific formulas for calculating the attention score based on graph convolution may be that:

$$\text{score} = \sigma(\tilde{A}X\theta)$$

$$\tilde{A} = D^{-1/2} A' D^{-1/2}$$

where, $\theta$ represents a trainable weight matrix of this layer, $\tilde{A}$ represents the regularized adjacency matrix, D represents a degree matrix, A' represents an adjacency matrix with self-loops, X represents a text graph feature vector, and $\sigma$ represents an activation function. After calculating the attention scores of the respective nodes, top-k nodes are selected to be retained while the node(s) with low attention score is/are deleted, and then the topology of the graph is updated.

S33, Graph Convolutional Layer

Figure 5:
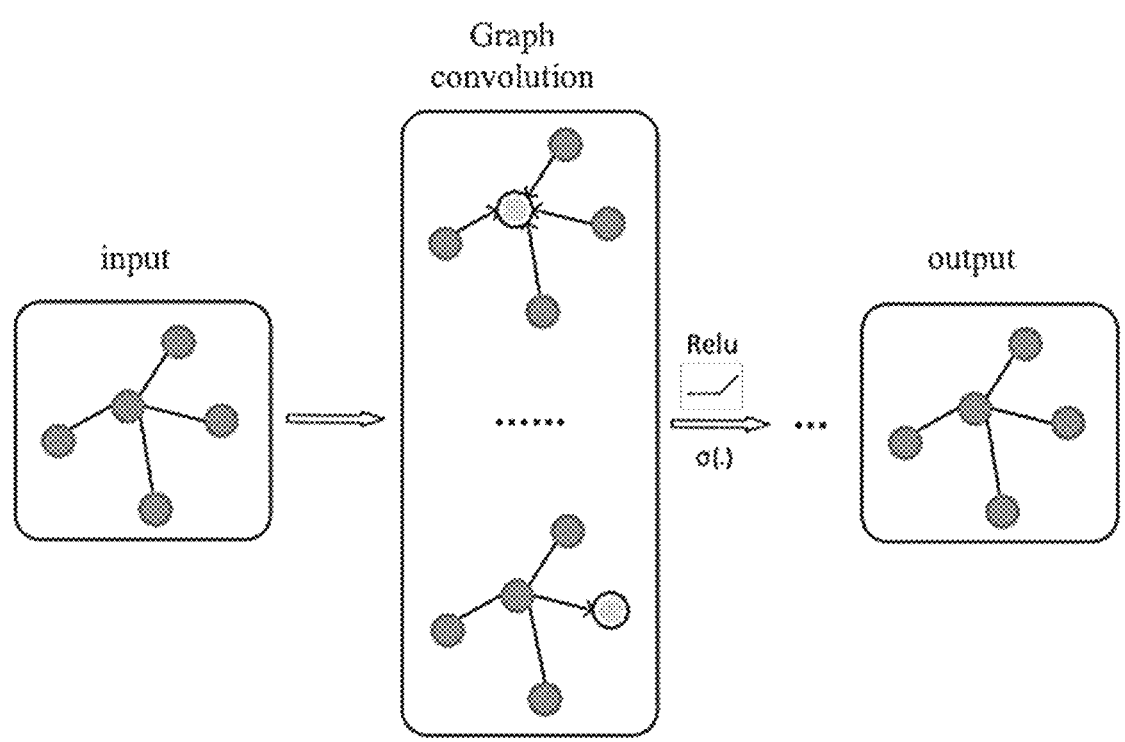
FIG. 5 illustrates a schematic operation diagram of a graph conventional network layer according to the invention.

As illustrated in FIG. 5, an action process of the graph convolutional layer may be that: the text graph vectors after passing through the first graph self-attention pooling layer are used as input, and since the graph convolution operator of this layer uses both a node feature vector matrix of the graph and a normalized Laplacian matrix of the graph to participate in calculation, therefore this layer also simultaneously learns attribute information of word nodes and structural information of the graph, thereby jointly obtaining higher level of node feature representations.

Specifically, an operation formula for the graph convolutional layer may be that:

$$X' = \sigma(\tilde{L}_{sym} \cdot X \cdot W)$$

where, $\tilde{L}_{sym}$ represents the normalized Laplacian matrix with self-loops, X and X' respectively represent node feature vector matrices of graph before and after the information transfer, W represents a trainable weight matrix, and $\sigma$ represents an activation function.

S34, Readout Function

Figure 6:
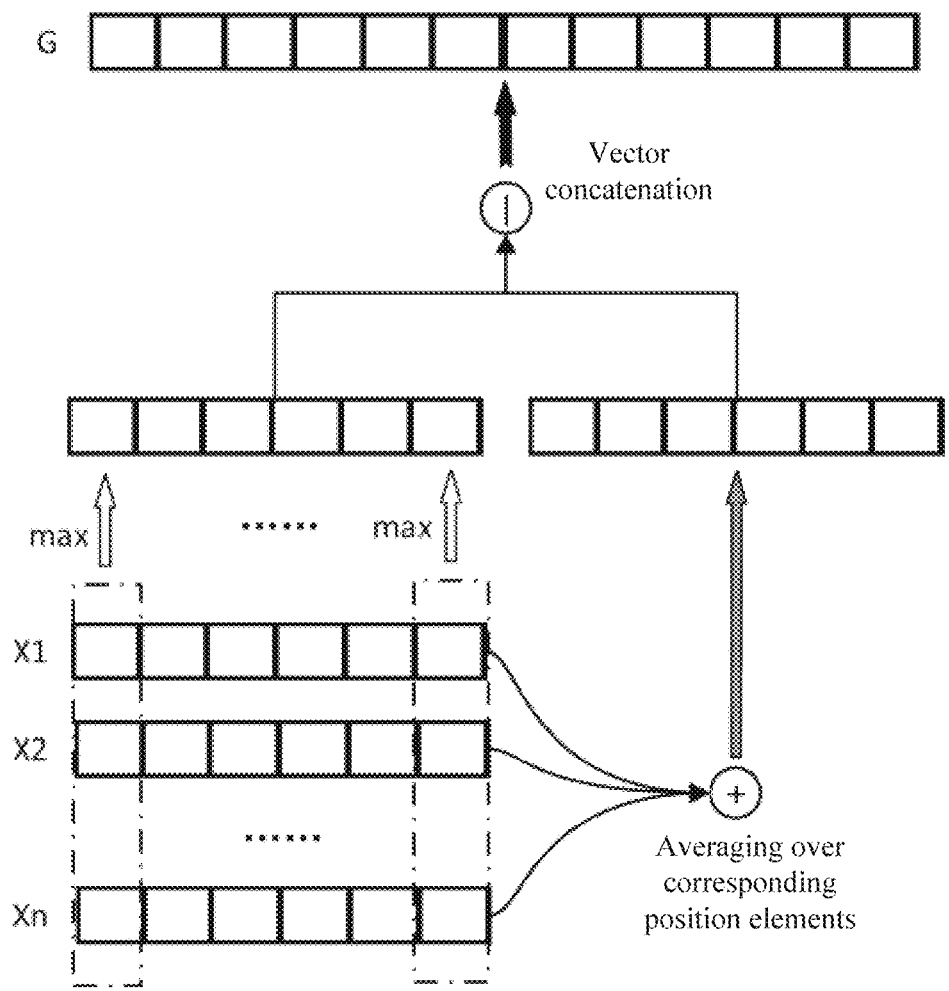
FIG. 6 illustrates a schematic operation diagram of a Readout function according to the invention.

As illustrated in FIG. 6, an action process of the Readout function may be that: the Readout function fuses various word node vector representations of the whole text graph to obtain a vector representation of the whole graph as a resultant/final vector representation of the text. A specific calculation of the Readout function may be that:

$$G = Concat\left(\max(X_1, \ldots, X_n), \frac{\sum_{i=1}^{n} X_i}{N}\right)$$

where, G represents the vector representation of the whole graph, $X_i$ represents the vector representation of a node i, Concat represents a vector concatenate function, max represents a maximum function, and N represents a total number of nodes in the graph. An objective of the Readout function is to simultaneously extract characteristic information and common information of the nodes in the graph. In the model, after passing through each of the two graph self-attention pooling layers, the text graph vector representation of the current layer is obtained through the Readout function, which represents the characteristic information and the common information of the whole text graph at the current layer, and the text graph vector representations of multiple levels from low-level to high-level are obtained through multiple (i.e., more than one) Readout functions.

S4, Feature Fusing

Based on the obtained text graph vector representations of the respective levels, a feature fusion function is used to obtain a multi-level resultant vector representation. A specific calculation formula for the feature fusion function may be that:

$$F = Concat(G_1, \ldots, G_k)$$

where, F represents the resultant vector representation after feature fusion, $G_k$ represents the text graph vector representation obtained by the Readout function of a $k^{th}$ level, k represents a total number of levels, and Concat represents a vector concatenate function.

S5, Sentiment Category Output

The resultant vector representation obtained by the feature fusion is taken as input, vectors are performed with linear transformation by a linear fully concatenated layer and then input to a SoftMax classification layer to obtain a sentiment category probability distribution, and a sentiment category corresponding to a maximum probability value is selected as the resultant sentiment category output of the text.

Embodiment 2

The embodiment 3 provides a text sentiment analysis system based on multi-level graph pooling, which may include: a text preprocessing module, a text graph building module, a multi-level graph pooling model constructing module, a feature fusing module, and a sentiment category outputting module.

In the embodiment, the text preprocessing module is configured to perform preprocessing on a target text. The preprocessing may include: removing noisy information, performing word segmentation, removing stop words, and training text representation of numerical vectorization.

In the embodiment, the text graph building module is configured to build a graph from each text individually, and specifically including to: set a sliding window with a fixed length to slide on word sequences of the text, calculate collocate point mutual information between word nodes, use the collocate point mutual information as an edge weight between the word nodes, and perform an edge connection between two words.

In the embodiment, the multi-level graph pooling model constructing module is configured to construct a multi-level graph pooling model, and the multi-level graph pooling model may include: a gated graph neural network layer, a first graph self-attention pooling layer, a graph convolutional layer, and a second graph self-attention pooling layer.

In the embodiment, the gated graph neural network layer is connected to the first graph self-attention pooling layer, the first graph self-attention pooling layer is connected to the graph convolutional layer, and the graph convolutional layer is connected to the second graph self-attention pooling layer.

In the embodiment, the gated graph neural network layer is configured to transfer low-level node information. The first graph self-attention pooling layer is configured to perform an initial graph pooling operation, and a Readout function is used to extract low-level features for obtaining a low-level text graph vector representation. An operator of the graph convolutional layer is configured to simultaneously employ a node feature vector matrix of the graph and a normalized Laplacian matrix of the graph to participate in calculation. The second graph self-attention pooling layer is configured to perform a second graph pooling operation to realize a pruning update on a structure of the graph by calculating attention scores of respective nodes of the graph, and a Readout function is used to extract high-level features for obtaining a high-level text graph vector representation.

In the embodiment, the feature fusing module is configured to perform feature fusion to obtain a multi-level resultant vector representation through a feature fusion function based on obtained text graph vector representations of respective levels.

In the embodiment, the sentiment category outputting module is configured to output a sentiment category, and specifically take the multi-level resultant vector representation as input, obtain a sentiment category probability distribution through a linear fully concatenated layer and a SoftMax classification layer, and select a sentiment category corresponding to a maximum probability value as a resultant sentiment category output of the text.

Embodiment 3

The embodiment 3 provides a storage medium. The storage medium may be a ROM, a RAM, a magnetic disk, an optical disk, or other storage medium; and the storage medium is stored with one or more programs, and when the one or more programs is/are executed by a processor, the text sentiment analysis method based on multi-level graph pooling of the Embodiment 1 can be implemented.

Embodiment 4

The embodiment 4 provides a computing device. The computing device may be a desktop computer, a notebook computer, a smart phone, a PDA handheld terminal, a tablet computer or other terminal device with a display function. The computing device includes a processor and a memory, and one or more programs are stored in the memory. When the processor executes the one or more programs stored in the memory, the text sentiment analysis method based on multi-level graph pooling of the Embodiment 1 can be implemented.

The above illustrated embodiments are preferred embodiments of the invention, but implementations of the invention are not limited by the above illustrated embodiments, and any other changes, modifications, substitutions, combinations and simplifications made without departing from the spirit and principle of the invention shall be equivalent substitutions and are included in the scope of protection of the invention.

What is claimed is:

1. A text sentiment analysis method based on multi-level graph pooling, comprising steps of:
preprocessing a target text, wherein the preprocessing comprises: removing noisy information, performing word segmentation, removing stop words, and training text representation of numerical vectorization;
building a graph from preprocessed text, comprising: setting a sliding window with a fixed length to slide on text word sequences, calculating collocate point mutual information between word nodes, taking the collocate point mutual information between the word nodes as an edge weight between the word nodes, and performing edge connection between words, to thereby build a text graph for each text individually;
constructing a multi-level graph pooling model, wherein the multi-level graph pooling model comprises: a gated graph neural network layer, a first graph self-attention pooling layer, a graph convolutional layer, and a second graph self-attention pooling layer; the gated graph neural network layer is connected to the first graph self-attention pooling layer, the first graph self-attention pooling layer is connected to the graph convolutional layer, and the graph convolutional layer is connected to the second graph self-attention pooling layer;
wherein the gated graph neural network layer is configured to transfer node information, which specifically comprises:
the gated graph neural network layer is set with a rest gate and an update gate, calculation formulas for the reset gate in one time of information transfer are as follows:

$$r_v = \sigma(W^{(r)} \cdot x_v + U^{(r)} h)$$

$$h = \frac{1}{K} \sum_i^K h_i$$

$$h' = \tanh(W \cdot x_v + r_v \odot Uh)$$

where, $x_v$ represents a feature vector of current central node, $h_i$ represents a feature vector of any one neighboring node of the current central node, h' represents feature information after passing through the reset gate, K represents a total number of neighboring nodes of the current central node, $W^{(r)}$, $u^{(r)}$, W and U represent trainable weight matrices, σ represent a sigmoid activation function, and ⊙ represents a Hadamard product operation;

calculation formulas for the update gate in one time of information transfer are as follows:

$$z_v = \sigma(W^{(z)} \cdot x_v + U^{(z)} h)$$

$$h = \frac{1}{K} \sum_i^K h_i$$

$$x'_v = z_v \odot h + (1 - z_v) \odot h'$$

where, $x_v'$ represent a feature vector obtained after the current central node passing through node information transfer and aggregation of the reset gate and the update gate, and $W^{(z)}$ and $U^{(z)}$ represent trainable weight matrices; and during each time of parameter update, each node receiving information of its neighboring nodes and sending information to its the neighboring nodes, realizing transfer of information in the text graph based on information transfer of gated recurrent unit (GRU) in text sequences, and outputting updated text graph vector representation; and wherein the first graph self-attention pooling layer is configured to perform an initial graph pooling operation and use a Readout function to extract low-level features for obtaining a low-level text graph vector representation; the graph convolution layer is configured to simultaneously employ a node feature vector matrix of the text graph and a normalized Laplacian matrix of the text graph to participate in calculation; and the second graph self-attention pooling layer is configured to perform a graph pooling operation again, perform a pruning update on a structure of the text graph through calculating attention scores of nodes in the text graph, and use a Readout function to extract high-level features for obtaining a high-level text graph vector representation;

feature fusion, comprising: using a feature fusion function to fuse obtained text graph vector representations of different levels to thereby obtain a multi-level resultant vector representation; and sentiment category output, comprising: taking the multi-level resultant vector representation as input, obtaining a sentiment category probability distribution through a linear fully concatenated layer and a SoftMax classification layer, and selecting a sentiment category corresponding to a maximum probability value as a resultant sentiment category output of text.

2. The text sentiment analysis method based on multi-level graph pooling as claimed in claim 1, wherein the removing noisy information comprises: using a regular expression to filter the noisy information;

wherein the performing word segmentation comprises: using a word segmentation tool to perform the word segmentation on text data that has been removed the noisy information to convert a text sequence into a corresponding word list after word segmentation;

wherein the removing stop words comprises: performing stop word processing through a stop word list on the corresponding word list after word segmentation to obtain a word list that has been removed the stop words; and wherein the training text representation of numerical vectorization comprises: employing a word2vec word feature embedding training to obtain initial word embedding vectors of the word list corresponding to the text data, and adding a vector representing a word position to each of the initial word embedding vectors to thereby obtain word embedding vectors fused with word position information.

3. The text sentiment analysis method based on multi-level graph pooling as claimed in claim 1, wherein calculation formulas for the calculating collocate point mutual information between word nodes comprise:

$$PMI(i, j) = \log \frac{p(i, j)}{p(i) \times p(j)}$$

$$p(i, j) = \frac{N(i, j)}{N}$$

$$p(i) = \frac{N(i)}{N}$$

$$p(j) = \frac{N(j)}{N}$$

where, PMI(i, j) represents the collocate point mutual information between word nodes, N(i, j) represents a quantity of collocate sliding windows each containing both a word node i and a word node j, N(i) represents a quantity of sliding windows each containing the node i, N(j) represents a quantity of sliding windows each containing the node j, and N represents a total quantity of sliding windows used for sliding the whole text.

4. The text sentiment analysis method based on multi-level graph pooling as claimed in claim 1, wherein the perform a pruning update on a structure of the text graph through calculating attention scores of nodes in the text graph comprises:

calculating the attention scores based on graph convolution through calculation formulas as follows:

$$score=\sigma(\tilde{A}X\theta)$$

$$\tilde{A} = D^{-\frac{1}{2}} A' D^{-\frac{1}{2}}$$

where, $\theta$ represents a trainable weight matrix, $\tilde{A}$ represents a regularized adjacency matrix, D represents a degree matrix, A' represents an adjacency matrix with self-loops, X represents a text graph feature vector, and a represents an activation function; and selecting top-k nodes to be retained according to calculated attention scores of nodes and updating a topology of the text graph.

5. The text sentiment analysis method based on multi-level graph pooling as claimed in claim 1, wherein a calculation formula for the graph convolutional layer is as follows:

$$X'=\sigma(\tilde{L}_{sym} \cdot X \cdot W)$$

where, $\tilde{L}_{sym}$ represents the normalized Laplacian matrix with self-loops, X and X' respectively represent node feature vector matrices of the text graph before and after the information transfer, W represents a trainable weight matrix, and $\sigma$ represents an activation function.

6. The text sentiment analysis method based on multi-level graph pooling as claimed in claim 1, wherein a calculation formula for each the Readout function is as follows:

$$G = Concat\left(\max(X_1, \ldots, X_n), \frac{\sum_{1}^{n} X_i}{N}\right)$$

where, G represents a vector representation of the whole text graph, $X_i$ represents a vector representation of a node i, Concat represents a vector concatenate function, max represents a maximum function, and N represents a total number of nodes in the text graph.

7. A non-transitory computer-readable storage medium stored with a program, wherein the program is configured to, when executed by a processor, implement the text sentiment analysis method based on multi-level graph pooling as claimed in claim 1.

8. A computing device, comprising: a processor and a memory stored with a program executable by the processor; wherein the processor is configured to, when executing the program stored in the memory, implement the text sentiment analysis method based on multi-level graph pooling as claimed in claim 1.

* * * * *